United States Patent Office 2,715,831
Patented Aug. 23, 1955

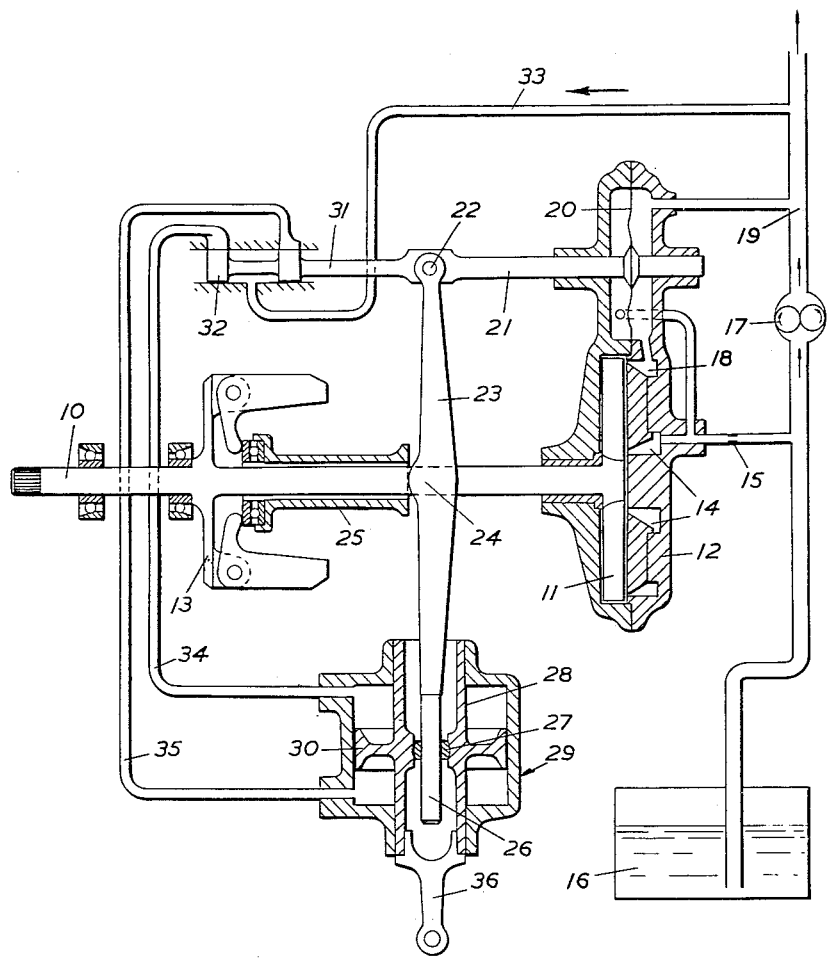

2,715,831

APPARATUS FOR SENSING CHANGES IN THE SPECIFIC GRAVITY OF A LIQUID

Adrian Leslie Catford, Hampton, and Thomas Allen Dunford, Greenford, England, assignors to D. Napier & Son Limited, London, England, a company of Great Britain Application September 8, 1953, Serial No. 379,051

Claims priority, application Great Britain September 11, 1952

7 Claims. (Cl. 73—32)

This invention relates to apparatus for sensing changes in the specific gravity of a liquid and is applicable more particularly, although not exclusively, to fuel supply systems for internal combustion engines.

With some fuels, especially the so-called "wide-cut" hydrocarbons, the specific gravity may vary over quite a wide range. Changes in temperature of the fuel also affect its specific gravity. In fuel supply systems for certain types of internal combustion engines the fuel is metered by volume, so that the actual weight of fuel admitted to an engine under a given set of operating conditions may vary considerably owing to changes in the specific gravity of the fuel. It is desirable, therefore, to have some means for sensing changes in the specific gravity which will enable appropriate corrections to be made in the control of the fuel supply. The present invention provides an apparatus suitable for this purpose.

According to the present invention apparatus for sensing changes in the specific gravity of a liquid comprises a rotary impeller which runs in the liquid and produces a pressure differential proportional to the specific gravity of the liquid and to the square of the speed of rotation, means for converting this pressure differential into a force (such as a diaphragm across which the pressure differential is applied), a rotary device driven synchronously with the impeller for producing a force proportional to the square of the speed of rotation (such as a pendulum type centrifugal device), a balancing device upon which the two forces act in opposition and which has a movable part for maintaining the balancing device in equilibrium, and an output member which is constituted by, or which moves with, the said movable part.

The term "synchronously" is used herein to indicate that the impeller and the rotary device are driven either at the same speed or at speeds which are directly proportional to each other.

Since both the forces acting on the balancing device are proportional to the square of the speed of rotation this variable cancels out when the balancing device is in equilibrium, so that the position of the movable part, and hence of the output member, affords an indication of the magnitude of the only other variable, namely the specific gravity of the liquid.

When the apparatus is used in the fuel supply system of an internal combustion engine, therefore, the output member may provide an indication of the specific gravity of the fuel, enabling appropriate adjustments of the fuel supply to be made. Alternatively the output member may be coupled to a control device in the fuel system for providing automatic adjustment of the fuel supply to compensate for changes in the specific gravity of the fuel.

Conveniently the balancing device comprises a lever on which the two forces act at different points to produce opposing couples, and the fulcrum of the lever is movable, constituting the said movable part.

In one form of the invention the movable part of the balancing device is moved by a servo mechanism controlled by the balancing device such that when the balancing device is thrown out of equilibrium by a change in the specific gravity of the liquid the movable member is moved by the servo mechanism in a direction tending to restore equilibrium. In this way the device is self-adjusting and an entirely automatic system of fuel control which compensates for changes in specific gravity of the fuel is obtainable.

In order to ensure that the impeller shall continuously sample the liquid it preferably acts against a pressure head which is sufficient to maintain a small reverse flow of liquid through the impeller.

One form of the invention, suitable for incorporation in the fuel supply system of an internal combustion engine, will now be specifically described by way of example with reference to the accompanying drawing, which is a diagram of the essential parts of the apparatus.

The apparatus comprises a driven shaft 10, which is driven from the engine or in any other convenient way. This shaft drives a multi-bladed impeller 11 rotating in a casing 12, and also drives a pendulum type centrifugal device 13.

The eye chamber 14 of the impeller 11 communicates through a restricted aperture 15 with a point in the fuel supply system between the tank 16 and the inlet side of a fuel supply pump 17. The periphery chamber 18 of the impeller 11 connects with the fuel supply system on the discharge side of the pump 17 at the point 19. The impeller 11 runs stalled, and the pressure head created by the supply pump 17 is sufficient to produce a small reverse flow of fuel through the impeller 11 from the periphery chamber 18 to the eye chamber 14, to ensure that the impeller continually samples a portion of the fuel which is being delivered and also to clear any air or vapour which may tend to accumulate in the impeller.

The pressure differential created between the periphery chamber 18 and the eye chamber 14 of the impeller is applied across a diaphragm 20 which converts this pressure differential into a force. The centre of the diaphragm 20 is connected to an axially movable diaphragm rod 21 which transmits the said force to one end 22 of a lever 23 which constitutes a balancing device. An intermediate point 24 of this lever bears against the sleeve 25 of the centrifugal device 13. The other end 26 of the lever 23 is formed as a slide on which can move a fulcrum 27 carried in the hollow piston rod 28 of a servomotor 29. The position of the piston 30 of the servomotor 29 thus determines the position of the fulcrum 27.

An extension 31 from the diaphragm rod 21 carries the control valve 32 for the servomotor 29. This valve regulates the supply and discharge of a pressure fluid, in this case fuel tapped off through a pipe 33, to and from opposite ends of the servomotor through pipes 34 and 35. When the lever 23 is in equilibrium the valve 32 is in a neutral position, as shown in the drawing, in which both the supply and the discharge of the pressure fluid are cut off, thereby locking the servomotor 29 and fixing the position of the fulcrum 27. If, however, the lever 23 should become unbalanced, the valve 32 is moved from its neutral position in one direction or the other dependent upon the direction of unbalance, and thereby admits pressure fluid to one end of the servomotor 29 for adjusting the position of the fulcrum 27. The arrangement is such that the servomotor 29 moves in a direction tending to restore the lever 23 to the condition of equilibrium.

The force acting on the lever 23 from the diaphragm 21 is proportional to the product of the specific gravity of the fuel and the square of the speed of rotation of the shaft 10. This force exerts a couple about the fulcrum equal to the product of the said force and the lever arm comprising the distance between the upper end 22 and of the lever 23 and the fulcrum 27. The centrifugal device 13 produces a force on its sleeve 25, and thus on the lever 23, which is proportional to the square of the speed of rotation of the shaft 10. This force produces a couple about the fulcrum 27 equal to the product of this force and the lever arm comprising the distance between the intermediate point 24 of the lever 23 and the fulcrum 27. Since both the couples include as a factor the square of the speed of rotation of the shaft 10, this factor cancels out, and in consequence the variables of the system are solely the specific gravity of the fuel and the lengths of the two lever arms referred to. Thus any unbalance of the lever 23 consequent upon a change in the specific gravity of the fuel can be compensated by an appropriate adjustment of the fulcrum 27 which alters the lengths of the lever arms. Thus the position of the fulcrum 27 when the lever 23 is in equilibrium provides an indication of the specific gravity of the fuel. The piston rod 28 which carries the fulcrum 27 conveniently serves as the output member of the apparatus, and can be coupled through a fitting 36 to any suitable indicator or part of the fuel control system.

The apparatus described operates as follows:

Assuming first that the engine is running at constant speed and that fuel at constant specific gravity is being delivered, a pressure differential will be created between the peripheral chamber 18 and the eye chamber 14 of the impeller 11, which pressure differential is applied across the diaphragm 20, so that a constant force is applied to the rod 21 and to the upper end 22 of the lever 23 toward the left. The rotation of the engine causes the weights of the centrifugal device 13 to produce a force on the sleeve 25 and on the intermediate point 24 of the lever 23 toward the right. The lever 23 is in equilibrium, the product of the force on the upper end 22 and the distance between the points 22 and 27 being equal to the product of the force on the intermediate point 24 and the distance between the points 24 and 27.

Should the engine speed alter, for instance if it should rise, while the specific gravity of the fuel remains constant, both the impeller 11 and the centrifugal device 13 will run faster. Since the pressure differential between the chambers 18 and 14 is proportional to the square of the impeller speed this pressure will rise correspondingly, and a correspondingly increased force in the leftward direction will be applied to the upper end of the lever 23. The force exerted by the centrifugal device 13 is also proportional to the square of the speed of rotation, and in consequence this force will also rise. Since the original forces on the lever were balanced the new forces will also be balanced, because they have both increased by a factor proportional to the square of the engine speed. The lever 23, therefore, remains balanced at all engine speeds without the fulcrum 27 having to be moved.

If there is a change, for instance a rise, in the specific gravity of the fuel being delivered, there will be a rise in pressure across the impeller 11. In this case, however, the rise in pressure will not be compensated by any corresponding change in the force exerted by the centrifugal device 13 and in consequence the increased force acting through the diaphragm 20 on the upper end 22 of the lever will throw the lever 23 out of balance. Consequently the upper end will move to the left, carrying with it the valve 32. This movement of the valve 32 puts the pipe 34 in communication with the pipe 33 and at the same time opens the pipe 25. Fuel at the delivery pressure is therefore applied above the servomotor piston 30, while the pressure is relieved below this piston. Consequently the piston 30 will descend. This produces a movement of the fulcrum 27 which increases distances between the points 22 and 27 and between the points 24 and 27. However, since the original distance between the points 22 and 27 was substantially greater than that between the points 24 and 27 the increase in the leverage exerted by the force acting at the intermediate point 24 will be greater than the increase in the leverage exerted by the force acting at the top end 22 of the lever. As the fulcrum descends, therefore, it will reach a position in which the system is again in equilibrium and the valve 32 has returned to the closed position.

Since the servomotor 29 can be made of any desired size, the magnitude of the adjusting force which can be obtained from the output member can have any desired value.

The force which is proportional only to the square of the speed of rotation may be derived from some other source than a centrifugal device. For instance, it may be derived from the pressure differential created by an impeller which rotates in a liquid of substantially constant specific gravity.

What we claim as our invention and desire to secure by Letters Patent is:

1. Apparatus for sensing changes in the specific gravity of a liquid, comprising a rotary impeller adapted to run in the liquid, said impeller thereby producing a pressure differential proportional to the specific gravity of the liquid and to the square of the speed of rotation, means for converting this pressure differential into a force, a rotary device adapted to produce a force proportional to the square of its speed of rotation, means for driving said rotary device synchronously with said impeller, a balancing device upon which said two forces act in opposition, a movable part adapted to maintain said balancing device in equilibrium, and an output member associated with said movable part.

2. Apparatus as claimed in claim 1, in which said means for converting the pressure differential into a force comprises a diaphragm across which the pressure differential is applied.

3. Apparatus as claimed in claim 1, in which said rotary device is a pendulum type centrifugal device.

4. Apparatus as claimed in in claim 1, in which said balancing device comprises a lever on which said two forces act at different points to produce opposing couples, and said movable part is the fulcrum of said lever.

5. Apparatus as claimed in claim 1, including a servo mechanism having a controlling member and a driven member, a connection between said balancing device and said controlling member, and a connection between said driven member and said movable member, said servo mechanism being adapted, when said balancing device is thrown out of equilibrium, to move said movable part in a direction tending to restore equilibrium.

6. Apparatus as claimed in claim 1 including means for applying a pressure head across said impeller sufficient to maintain a reverse flow of liquid through said impeller.

7. Apparatus for sensing changes in the specific gravity of a liquid, comprising a rotary impeller adapted to run in said liquid, said impeller thereby producing a pressure differential proportional to the specific gravity of the liquid and to the square of the speed of rotation, means for applying a pressure head across the said impeller sufficient to maintain a reverse flow of liquid through said impeller, a diaphragm across which said pressure head is applied, a pendulum type centrifugal device for producing a force proportional to the square of the speed of its rotation, means for driving said centrifugal device synchronously with said impeller, a lever on which said two forces act at different points to produce opposing couples, a movable fulcrum for said lever, a servo mechanism having a controlling member and a driven member, a connection between said lever and said controlling member, a connection between said driven member and said fulcrum, said servo mechanism being adapted, when said lever is moved out of an equilibrium position, to move said fulcrum in a direction tending to restore equilibrium, and an output member associated with said fulcrum.

References Cited in the file of this patent

UNITED STATES PATENTS 2,615,328     Dolza _____ Oct. 28, 1952